United States Patent [19]

Schwager et al.

[11] Patent Number: 5,536,789
[45] Date of Patent: Jul. 16, 1996

[54] PROPYLENE POLYMERS HAVING A BROAD MOLECULAR WEIGHT RATIO Q

[75] Inventors: Harald Schwager, Speyer; Peter Koelle, Ludwigshafen; Rueger Schlund, Mannheim; Ralf Zolk, Weisenheim; Juergen Kerth, Carlsberg; Guenther Schweter, Friedelsheim; Klaus-Dieter Hungenberg, Birkenau; Werner Schoene, Schriesheim, all of Germany

[73] Assignee: BASF Aktiengesellschaft, Ludwigshafen, Germany

[21] Appl. No.: 427,273

[22] Filed: Apr. 24, 1995

Related U.S. Application Data

[63] Continuation of Ser. No. 714,291, Jun. 12, 1991, abandoned.

[30] Foreign Application Priority Data

Jun. 15, 1990 [DE] Germany .................. 40 19 053.6

[51] Int. Cl.$^6$ .................. C08F 255/02; C08F 297/08; C08F 10/06; C08F 2/34
[52] U.S. Cl. .................. 525/322; 525/247; 525/266; 525/339; 525/384; 526/65; 526/66; 526/351
[58] Field of Search .................. 525/322, 266, 525/247; 526/351, 65

[56] References Cited

U.S. PATENT DOCUMENTS

| | | | |
|---|---|---|---|
| 4,454,299 | 6/1984 | Schweier | 525/53 |
| 4,455,405 | 6/1984 | Jaggard et al. | 525/53 |
| 4,547,552 | 10/1985 | Toyota | 525/247 |
| 4,739,015 | 4/1988 | Toyota | 525/270 |
| 4,849,487 | 7/1989 | Kaminsky et al. | 526/160 |
| 4,977,210 | 12/1990 | Kerth et al. | 525/53 |

FOREIGN PATENT DOCUMENTS

| | | |
|---|---|---|
| 0114391 | 8/1984 | European Pat. Off. . |
| 0320150 | 6/1989 | European Pat. Off. . |
| 843563 | 5/1984 | South Africa . |
| 843561 | 5/1984 | South Africa . |
| 845261 | 7/1984 | South Africa . |

OTHER PUBLICATIONS

Grant & Hackh's Chemical Dictionary, Fifth Edition, 1987, McGraw–Hill Co. p. 462.

*Primary Examiner*—Fred Zitomer
*Attorney, Agent, or Firm*—Keil & Weinkauf

[57] ABSTRACT

Propylene polymers have a molecular weight ratio Q ($\bar{M}_w/\bar{M}_n$) of from 6 to 30 and are obtainable by Ziegler-Natta polymerization in the presence of hydrogen as molecular weight regulator and are particularly suitable for the production of films and moldings.

7 Claims, No Drawings

PROPYLENE POLYMERS HAVING A BROAD MOLECULAR WEIGHT RATIO Q

This application is a continuation of application Ser. No. 07/714,291, filed on Jun. 12, 1991 now abandoned.

The present invention relates to propylene polymers having a molecular weight ratio Q ($\overline{M}_w/\overline{M}_n$) of from 6 to 30.

The present invention also relates to a process for the preparation of these polymers, and to films and moldings made from these polymers.

The preparation of propylene polymers by Ziegler-Natta polymerization has already been described a number of times. The catalyst components used contain, inter alia, compounds of polyvalent titanium, aluminum halides and/or alkylaluminum compounds, and electron-donor compounds, which are usually silanes, esters, ethers, ketones or lactones (EP-B 14 523, EP-B 45 977, EP-B 86 473, EP-A 171 200 and U.S. Pat. No. 4,857,613).

In addition, processes have been disclosed for the preparation of propylene-ethylene block copolymers using a Ziegler-Natta catalyst system (U.S. Pat. No. 4,454,299, U.S. Pat. No. 4,455,405, ZA-A 0084/3561, ZA-A 0084/3563 and ZA-A 0084/5261), in which first gaseous propylene is polymerized in a first reaction zone, and the resultant homopolymer is subsequently transferred into a second reaction zone, where a mixture of ethylene and propylene is polymerized on. The process is usually carried out at superatmospheric pressure and in the presence of hydrogen as molecular weight regulator. In order for this process to give block copolymers having good applicational properties, it is necessary, inter alia, to use relatively large amounts of hydrogen, in particular in the second reactor, which results in an extra cost in the process. As a consequence of this specific procedure, the copolymers obtainable have, in particular, good processing properties.

Compared with copolymers of this type, the propylene homopolymers prepared using Ziegler-Natta catalysts have, inter alia, higher rigidity. However, this property has the consequence that the processing of propylene polymers is associated with a considerable extra cost since materials of this type are generally brittle. For entire series of applications, however, good processing properties are considerably more important than, for example, improved rigidity, since it is entirely sufficient in these areas for the propylene polymers to have moderate mechanical strength.

It is therefore an object of the present invention to remedy the outlined disadvantages, and to develop propylene polymers which have improved processing properties.

We have found that this object is achieved by the novel propylene polymers defined at the outset.

These polymers have a broad molecular weight ratio Q ($\overline{M}_w/\overline{M}_n$) of from 6 to 30, preferably from 8 to 30, in particular from 10 to 30. The molecular weight ratio Q is the ratio between the weight average molecular weight $\overline{M}_w$ and the number average molecular weight $\overline{M}_n$ of the polymers according to the invention.

The process which gives these polymers can be carried out in conventional reactors used for the polymerization of propylene, either batchwise or preferably continuously. Suitable reactors are, inter alia, continuously operated stirred reactors, usually involving a plurality of consecutive stirred reactors. The reactors contain a fixed bed of finely divided polymer which is usually agitated by stirring.

The process can be carried out using the Ziegler-Natta catalysts which are customary in polymerization technology. These contain, inter alia, a titanium-containing solid component and a cocatalyst, which can be an aluminum compound. Besides this aluminum compound, a further constituent of the cocatalyst is preferably an electron-donor compound.

The titanium-containing solid component is generally prepared using, as the titanium compound, a halide or alkoxide of trivalent or tetravalent titanium, preference being given to titanium chlorides, in particular titanium tetrachloride. The titanium-containing solid component advantageously contains a finely divided carrier, for which purpose silica, alumina and aluminum silicates of the empirical formula $SiO_2 \cdot aAl_2O_3$ where a is from 0.001 to 2, in particular from 0.01 to 0.5 have proven suitable.

The preferred carriers have a particle diameter of from 0.1 to 1,000 μm, in particular from 10 to 300 μm, a pore volume of 0.1 to 10 cm³/g, in particular from 1.0 to 5.0 cm³/g, and a specific surface area of from 10 to 1,000 m²/g, in particular from 100 to 500 m²/g.

The preparation of the titanium-containing solid component is also carried out using, inter alia, compounds of magnesium, in particular magnesium halides, alkylmagnesium compounds and arylmagnesium compounds, and alkoxymagnesium and aryloxymagnesium compounds, preferably magnesium dichloride, magnesium dibromide and magnesium di($C_1$–$C_{10}$-alkyl) compounds. In addition, the titanium-containing solid component may also contain halogen, preferably chlorine or bromine.

Furthermore, the titanium-containing solid component also contains electron-donor compounds, for example monofunctional or polyfunctional carboxylic acids, carboxylic anhydrides and carboxylic esters, ketones, ethers, alcohols, lactones, and organophosphorus and organosilicon compounds. Preferred electron-donor compounds within the titanium-containing solid component are phthalic acid derivatives of the general formula I

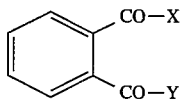

where X and Y are each chlorine or $C_1$- to $C_{10}$-alkoxy or together are oxygen. Particularly preferred electron donor compounds are phthalic esters, where X and Y are $C_1$–$C_8$-alkoxy, for example methoxy, ethoxy, propoxy or butoxy.

Other preferred electron-donor compounds within the titanium-containing solid component are, inter alia, diesters of 3- or 4-membered, substituted or unsubstituted cycloalkyl-1,2-dicarboxylic acids, and monoesters of substituted or unsubstituted benzophenone-2-carboxylic acids. The hydroxyl compounds used in these esters are alcohols which are customary in esterification reactions, inter alia $C_1$- to $C_{15}$-alkanols, $C_5$- to $C_7$-cycloalkanols which can themselves carry $C_1$- to $C_{10}$-alkyl groups, and furthermore phenols, naphthols and $C_1$- to $C_{10}$-alkyl derivatives of these compounds.

The titanium-containing solid component can be prepared by conventional methods, for example as described, inter alia, in EP-A 45 975, EP-A 45 977, EP-A 86 473, EP-A 171 200 and GB-A 2,111,066.

The titanium-containing solid component is preferably prepared by the three-step process described below.

In the first step, a solution of the magnesium-containing compound in a liquid alkane is first added to a finely divided carrier, preferably silica or $SiO_2 \cdot aAl_2O_3$, where a is from 0.001 to 2, in particular from 0.01 to 0.5, and this mixture is then stirred for from 0.5 to 5 hours at from 10° to 120° C. From 0.1 to 1 mol of the magnesium compound is preferably employed per mol of the carrier. A halogen or a hydrogen halide, in particular chlorine or hydrogen chloride, in a two-fold, preferably five-fold, molar excess or more, based on the magnesium-containing compound, is then added with constant stirring. After from about 30 to 120 minutes, the solid is separated from the liquid phase.

In the second step, the product obtained in this way is introduced into a liquid alkane, and a $C_1$- to $C_8$-alkanol, in particular ethanol, a halide or an alkoxide of trivalent or tetravalent titanium, in particular titanium tetrachloride, and an electron-donor compound, in particular a phthalic acid derivative of the general formula I, are then added. From 1 to 5 mol, in particular from 2 to 4 mol, of alkanol, from 2 to 20 mol, in particular from 4 to 10 mol, of trivalent or tetravalent titanium and from 0.01 to 1 mol, in particular from 0.1 to 1.0 mol, of the electron-donor compound are employed per mol of magnesium in the solid obtained from the first step. This mixture is stirred for one hour or more at from 10° to 150° C., and the resultant solid is subsequently filtered off and washed with a liquid alkane, preferably hexane or heptane.

In the third step, the solid obtained from the second step is extracted for a few hours at from 100° to 150° C. with excess titanium tetrachloride or an excess of a solution of titanium tetrachloride in an inert solvent, preferably an alkylbenzene, the solvent containing 5% by weight or more of titanium tetrachloride. The product is then washed with a liquid alkane until the content of titanium tetrachloride in the washings is less than 2% by weight.

The titanium-containing solid component obtainable in this way is used with a cocatalyst as the Ziegler-Natta catalyst system. Suitable cocatalysts here are aluminum compounds.

Suitable aluminum compounds are trialkylaluminum and compounds in which an alkyl has been replaced by alkoxy or halogen, for example by chlorine or bromine. Preference is given to trialkylaluminum compounds whose alkyl groups each have from 1 to 8 carbon atoms, for example trimethylaluminum, triethylaluminum or methyldiethylaluminum.

In addition to the aluminum compound, preference is given as a further cocatalyst to electron-donor compounds, such as monofunctional or polyfunctional carboxylic acids, carboxylic anhydrides and carboxylic esters, ketones, ethers, alcohols, lactones and organophosphorus and organosilicon compounds. Particularly suitable electron-donor compounds here are organosilicon compounds of the general formula II

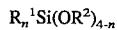
$$R_n^1 Si(OR^2)_{4-n} \qquad \text{II}$$

where $R^1$ is identical or different $C_1$- to $C_{20}$-alkyl, 5- to 7-membered cycloalkyl, which may itself carry $C_1$- to $C_{10}$-alkyl, or $C_6$- to $C_{20}$-aryl or -arylalkyl, $R^2$ is identical or different $C_1$- to $C_{20}$-alkyl, and n is 1, 2 or 3. Particular preference is given to compounds in which $R^1$ is $C_1$- to $C_8$-alkyl or 5- to 7-membered cycloalkyl, $R^2$ is $C_1$- to $C_4$-alkyl, and n is 1 or 2.

Of these compounds, dimethoxydiisopropylsilane, dimethoxyisobutylisopropylsilane, dimethoxydiisobutylsilane, dimethoxydicyclopentylsilane and diethoxyisobutylisopropylsilane should be emphasized.

Preference is given to catalyst systems in which the atomic ratio between aluminum from the aluminum compound and titanium from the titanium-containing solid component is from 10:1 to 800:1, in particular from 20:1 to 200:1, and the molar ratio between the aluminum compound and the electron-donor compound employed as cocatalyst is from 1:1 to 100:1, in particular from 2:1 to 80:1. The catalyst constituents may be introduced into the polymerization system individually in any desired sequence or as a mixture of the components.

The polymerization in the first step is carried out at from 20 to 40 bar, at from 60° to 90° C. and at a mean residence time of the reaction mixture of from 1 to 5 hours, preferably at from 25 to 35 bar, from 65° to 85° C. and at a mean residence time of from 1.5 to 4 hours. The reaction conditions are usually selected in such a manner that from 0.05 to 2 kg, preferably from 0.1 to 1.5 kg, of a propylene polymer are formed per mmol of the aluminum component in the first polymerization zone.

In the first polymerization step, the ratio between the partial pressures of the hydrogen, if being used in this step as a molecular weight regulator, and the propylene is set at less than 2:100, preferably less than 1:100, in particular less than 0.5:100. In a particularly preferred embodiment, no hydrogen is used.

The propylene polymer formed is discharged from the first polymerization step together with the catalyst after completion of the reaction and introduced into the second polymerization step, where further propylene is polymerized on. The pressure prevailing in the second polymerization step is 7 bar, preferably at least 10 bar, below that in the first polymerization step and is from 5 to 30 bar, preferably from 10 to 25 bar. The temperature is from 30° to 120° C., preferably from 50° to 110° C., and the mean residence time of the polymer is from 1 to 5 hours, preferably from 1.5 to 4 hours.

According to the invention, the ratio between the partial pressures of the hydrogen employed as regulator and the propylene in the second polymerization step is set at from 1:100 to 50:100, preferably from 1:100 to 10:100, in particular from 1:100 to 6:100. It is furthermore necessary for the weight ratio between the monomers reacted in the first and second polymerization zones to be in the range from 0.4:1 to 20:1, in particular from 0.5:1 to 15:1. In certain processes, ratios of from 0.4:1 to 6:1, in particular from 0.5:1 to 5:1, have proven successful.

In a further embodiment of the process resulting in the propylene polymers according to the invention, a $C_1$-$C_8$-alkanol, in particular a $C_1$-$C_4$-alkanol, which affects the activity of the Ziegler-Natta catalyst, is added to the reaction mixture in the second polymerization step. Alkanols which are highly suitable for this purpose are, inter alia, methanol, ethanol, n-propanol, n-butanol and, very particularly, isopropanol. The amount of the $C_1$-$C_8$-alkanol is expediently such that the molar ratio between the aluminum component of the Ziegler-Natta catalyst and the $C_1$-$C_8$-alkanol added in the second polymerization step is set to from 0.1:1 to 10:1, in particular to from 0.2:1 to 5:1.

These process steps can be used to prepare the propylene polymers according to the invention. This is taken to mean, in particular, propylene homopolymers. In addition, the polymers according to the invention may also contain small amounts of other $C_2$–$C_{10}$-alk-1-enes, for example ethylene, but-1-ene, pent-1-ene or hex-1-ene, the ratio between the partial pressures of the further $C_2$–$C_{10}$-alk-1-enes and the propylene in this case being not more than 1:100, preferably not more than 0.5:100. These small amounts of $C_2$–$C_{10}$-alk-1-enes can be added either in the first or second polymerization step.

The mean molecular weights ($\overline{M}_w$) of the polymers according to the invention are preferably from 10,000 to 500,000, and the melt flow indices are from 0.1 to 100 g/10 min, preferably from 0.2 to 50 g/10 min, in each case measured in accordance with DIN 53 735 at 230° C. and 2.16 kg or 21.6 kg. The melt flow index corresponds to the amount of polymer forced out of the test apparatus standardized in accordance with DIN 53 735 within 10 minutes at 230° C. and under a weight of 2.16 kg or 21.6 kg.

As a consequence of the broader molecular weight distribution at the same melt flow index, the propylene polymers according to the invention have better flow properties and improved applicational properties than the propylene polymers known hitherto. This has the consequence that the processing of such polymers, for example in extruders, in injection molding or in thermoforming, is considerably simplified.

These improved applicational properties make the polymers according to the invention suitable, inter alia, for the production of films, tubes, coverings, fibers, hollow articles, injection-molded articles and moldings for vehicle construction.

EXAMPLES

Examples 1–6

In all Examples 1–6, the process was carried out in two consecutive stirred autoclaves having an effective capacity of 180 l each. Each reactor contained an agitated fixed bed of finely divided polypropylene.

In the first polymerization reactor, propylene in gas form was passed in and polymerized at a mean residence time of 3 hours using a Ziegler-Natta catalyst. The precise experimental conditions, the ratio between the partial pressures of the hydrogen used as molecular weight regulator and the propylene, the weight ratio between the monomers reacted in the first polymerization step and those reacted in the second step, and the melt flow indices of the polymers obtained are given in Table 1 for all the examples.

In all the examples, the polymerization was carried out continuously using a Ziegler-Natta catalyst, 1 g of a titanium-containing solid component, 60 mmol of triethylaluminum and 6 mmol of dimethoxyisobutylisopropylsilane, in each case per hour, being used as the catalyst constituents. 0.4 kg of propylene copolymer was produced in the first polymerization zone per mmol of the aluminum compound.

The propylene polymer formed in the first reactor was subsequently transferred together with the catalyst into the second stirred autoclave, where further propylene was polymerized onto the polymer at a residence time of 3 hours. The precise experimental conditions, the ratio between the partial pressures of hydrogen and propylene, the melt flow indices and the molecular weight distribution Q of the polymers obtained are given in Table 2 for all the examples.

The titanium-containing solid component was prepared by the following process.

In a first step, butyloctylmagnesium dissolved in n-heptane was added to $SiO_2$ which had a particle diameter of from 20 to 45 μm, a pore volume of 1.75 cm³/g and a surface area of 320 m²/g, 0.3 mol of the magnesium compound being employed per mol of $SiO_2$. The solution was stirred at 90° C. for 1.5 hours and then cooled to 20° C., and 10 times the molar amount, based on the organomagnesium compound, of hydrogen chloride was subsequently passed in. After 30 minutes, the solid phase product was separated off from the solvent.

The product obtainable from the first step was mixed with n-heptane, and 3 mol of ethanol, based on 1 mol of magnesium, were subsequently added with constant stirring. This mixture was stirred at 80° C. for 1.5 hours, and then 6 mol of titanium tetrachloride and 0.5 mol of di-n-butyl phthalate, in each case based on 1 mol of magnesium, were added. The reaction mixture was stirred for a further two hours, and the solid was then separated off from the solvent by filtration.

The product obtained in this way was extracted for two hours at 125° C. with a 15 percent by weight solution of titanium tetrachloride in ethylbenzene. The solid product was then separated from the extractant by filtration and washed with n-heptane until the washings contained not more than 0.3% by weight of titanium tetrachloride.

The resultant titanium-containing solid component contained 3.1% by weight of titanium, 7.5% by weight of magnesium and 28.3% by weight of chlorine.

TABLE 1

Reaction conditions in the first polymerization step

| Ex. | Temperature [°C.] | Pressure [bar] | Hydrogen: propylene ratio | Melt flow index [g/10 min] | Weight ratio between the monomers reacted in the 1st and 2nd polymerization |
|---|---|---|---|---|---|
| 1 | 70 | 28 | 0:100 | 8.1[a] | 1:1 |
| 2 | 70 | 28 | 0.1:100 | 0.9[b] | 1:1 |
| 3 | 80 | 32 | 0:100 | 7.8[a] | 1.5:1 |
| 4 | 70 | 28 | 0:100 | 8.0[a] | 1:1.5 |
| 5 | 70 | 28 | 0:100 | 10.5[a] | 5:1 |
| 6 | 80 | 32 | 0:100 | 11.4[a] | 1:1 |

TABLE 2

Reaction conditions in the second polymerization step

| Ex. | Temperature [°C.] | Pressure [bar] | Hydrogen: propylene ratio | Melt flow index [g/10 min] | Molecular weight ratio Q [$\bar{M}_w/\bar{M}_n$] |
|---|---|---|---|---|---|
| 1 | 90 | 21 | 2:100 | 1.8[b] | 12 |
| 2 | 90 | 21 | 1.6:100 | 3.4[b] | 14 |
| 3 | 100 | 21 | 3:100 | 3.6[b] | 12 |
| 4 | 100 | 21 | 2.5:100 | 3.5[b] | 13 |
| 5 | 100 | 21 | 6:100 | 27[a] | 9 |
| 6 | 90 | 21 | 1:100 | 1.3[b] | 6 |

[a] Melt flow index in accordance with DIN 53 735, at 230° C. and 21.6 kg
[b] Melt flow index in accordance with DIN 53 735, at 230° C. and 2.16 kg

Examples 7–9

In Examples 7–9, the process was carried out in two consecutive stirred autoclaves having an effective capacity of 180 l each. Each reactor contained an agitated fixed bed of finely divided polypropylene.

In the first polymerization reactor, propylene in gas form was passed in and polymerized at a mean residence time of 2.5 hours using a Ziegler-Natta catalyst without hydrogen as regulator. The precise experimental conditions, the molecular weights of the polypropylenes obtained and the weight ratio between the monomers reacted in the first polymerization step and those reacted in the second step are shown in Table 3 for all the examples.

In all the examples, the polymerization was carried out continuously using a Ziegler-Natta catalyst, 1 g of the same titanium-containing solid component as already used in Examples 1–6, 60 mmol of triethylaluminum and 6 mmol of dimethoxyisobutylisopropylsilane, in each case per hour, being used as the catalyst constituents. 0.4 kg of propylene copolymer was produced in the first polymerization step per mmol of the aluminum compound.

The propylene polymer formed in the first reactor was subsequently transferred together with the catalyst into the second stirred autoclave, where further propylene was polymerized onto the polymer at a residence time of 2.5 hours in the presence of isopropanol. The precise experimental conditions, the amounts of isopropanol added, the ratio between the partial pressures of hydrogen and propylene, the melt flow indices, the molecular weights and the molecular weight distribution Q of the polymers obtained are given in Table 4 for all the examples.

TABLE 3

Reaction conditions in the first polymerization step

| Ex. | Temperature [°C.] | Pressure [bar] | Molecular weight [$M_w$] of the propylene obtained | Weight ratio between the monomers reacted in the 1st and 2nd polymerization steps |
|---|---|---|---|---|
| 7 | 70 | 28 | 1 500 000 | 1.1:1 |
| 8 | 70 | 28 | 1 500 000 | 2.1:1 |
| 9 | 70 | 28 | 1 500 000 | 6.3:1 |

TABLE 4

Reaction conditions in the second polymerization step

| | Example | | |
|---|---|---|---|
| | 7 | 8 | 9 |
| Temperature [°C.] | 100 | 100 | 100 |
| Pressure [bar] | 21 | 21 | 21 |
| Amount of isopropanol[a] [mmol/h] | 50 | 75 | 83 |
| Ratio between the amount of aluminum component and the amount of isopropanol | 1.20 | 0.8 | 0.72 |
| Hydrogen:propylene ratio | 5:100 | 5.7:100 | 6:100 |
| Melt flow index[b] [g/10 min] | 0.4 | 0.1 | 0.08 |
| Melt flow index[c] [g/10 min] | 72 | 31 | 23 |
| Molecular weight [$M_w$] | 811000 | 1000000 | 1100000 |
| Molecular weight ratio Q [$\bar{M}_w/\bar{M}_n$] | 14 | 13 | 10 |

[a] Amount of isopropanol added per hour in the second polymerization step
[b] Melt flow index in accordance with DIN 53 735 at 230° C. and 2.16 kg
[c] Melt flow index in accordance with DIN 53 735, at 230° C. and 21.6 kg The high molecular weight ratio Q and the associated broad molecular weight distribution makes the propylene polymers according to the invention easy to process.

We claim:

1. A propylene homopolymer having a molecular weight ratio Q ($\bar{M}_w/\bar{M}_n$) of from 6 to 30, obtained by two-step polymerization from the gas phase in an agitated fixed bed in the presence of hydrogen as molecular weight regulator, by means of a Ziegler-Natta catalyst containing a titanium-containing solid component prepared from a titanium compound, a magnesium compound, a halogen and an electron donor compound, a trialkylaluminum component, in which an alkyl can be replaced by an alkoxy or by a halogen and an organo-silicon compound as another electron donor component, wherein a) in a first polymerization step, propylene is polymerized at from 20 to 40 bar and from 60° to 90° C. and at a mean residence time of the reaction mixture of from 1 to 5 hours, the ratio between the partial pressures of hydrogen, if used in this step, and propylene being less than 2:100, and subsequently b) in a second polymerization step, propylene is addition-polymerized onto the polymer from the first polymerization step at from 5 to 30 bar, this pressure being at least 7 bar below the pressure in the first polymerization step, and from 30° to 110° C. and at a mean residence time of the reaction mixture of from 1 to 5 hours, the ratio between the partial pressures of hydrogen and propylene being set at from 1:100 to 50:100, and the weight ratio between the monomers reacted in the first and second polymerization steps being in the range of from 0.4:1 to 20:1.

2. A homopolymer as defined in claim 1, obtained by carrying cut the first polymerization step a) at a ratio between the partial pressures of hydrogen and propylene of less than 1:100.

3. A homopolymer as defined in claim 1, obtained by carrying out the second polymerization step b) at a ratio between the partial pressures of hydrogen and propylene of from 1:100 to 10:100.

4. A homopolymer as defined in claim 1, obtained by setting the weight ratio between the monomers reacted in the first and second polymerization steps at from 0.5:1 to 15:1.

5. A homopolymer as defined in claim 1, obtained by carrying out the polymerization in the second polymerization step in the presence of a $C_1$–$C_8$-alkanol.

6. A homopolymer as defined in claim 1, obtained by setting the molar ratio between the aluminum component of the Ziegler-Natta catalyst system and the $C_1$–$C_8$-alkanol added in the second polymerization step to from 0.1:1 to 10:1.

7. A homopolymer as defined in claim 1, obtained by carrying out the polymerization in the second polymerization step in the presence of a $C_1$–$C_4$-alkanol.

* * * * *

UNITED STATES PATENT AND TRADEMARK OFFICE
CERTIFICATE OF CORRECTION

PATENT NO.: 5,536,789

DATED: July 16, 1996

INVENTOR(S): SCHWAGER et al.

It is certified that error appears in the above-identified patent and that said Letters Patent is hereby corrected as shown below:

On the title page, item [75], the sixth inventor's last name, "Schweter" should be --Schweier--.

Column 8, claim 2, line 26, "cut" should be --out--.

Signed and Sealed this

Fifth Day of November, 1996

Attest:

BRUCE LEHMAN

Attesting Officer

Commissioner of Patents and Trademarks